(12) United States Patent
Leethaus et al.

(10) Patent No.: US 10,920,845 B2
(45) Date of Patent: Feb. 16, 2021

(54) ARTICLE, PARTICULARLY AN AIR SPRING BELLOWS, A METAL-RUBBER ELEMENT, OR A VIBRATION DAMPER

(71) Applicant: ContiTech Luftfedersysteme GmbH

(72) Inventors: Thorsten Leethaus, Eschershausen (DE); Claus-Lueder Mahnken, Ahausen (DE); Gerd Niklaus, Neustadt (DE); Christoph Zander, Grosshansdorf (DE); Mark Lindenberg, Garbsen (DE); Rene Sandmann, Freden (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 382 days.

(21) Appl. No.: 15/759,765

(22) PCT Filed: Jun. 13, 2016

(86) PCT No.: PCT/EP2016/063430
§ 371 (c)(1),
(2) Date: Mar. 13, 2018

(87) PCT Pub. No.: WO2017/045784
PCT Pub. Date: Mar. 23, 2017

(65) Prior Publication Data
US 2019/0048963 A1    Feb. 14, 2019

(30) Foreign Application Priority Data
Sep. 17, 2015  (DE) .................... 10 2015 217 873

(51) Int. Cl.
*F16F 9/04* (2006.01)
*F16G 1/10* (2006.01)
*F16G 5/08* (2006.01)

(52) U.S. Cl.
CPC .............. *F16F 9/0409* (2013.01); *F16G 1/10* (2013.01); *F16G 5/08* (2013.01); *F16F 2230/40* (2013.01)

(58) Field of Classification Search
USPC .......................... 442/318; 474/260–263, 267
See application file for complete search history.

(56) References Cited

U.S. PATENT DOCUMENTS

| | | | | |
|---|---|---|---|---|
| 5,529,826 A | * | 6/1996 | Tailor ........................ | A61F 5/01 428/110 |
| 2005/0075028 A1 | * | 4/2005 | Rock ......................... | B32B 7/05 442/318 |

(Continued)

FOREIGN PATENT DOCUMENTS

| | | |
|---|---|---|
| CN | 103333364 A | 10/2013 |
| CN | 203322131 U | 12/2013 |

(Continued)

*Primary Examiner* — Lynda Salvatore
(74) *Attorney, Agent, or Firm* — Gregory Adams; David Cate

(57) ABSTRACT

The invention relates to an article having a main body with elastic characteristics, in particular an air spring bellows, a metal-rubber element or a vibration damper.

The article has a single-layer or multilayer main body having elastic properties, wherein the outer layer C has at least two laminas C1/C2 and each lamina is formed from an elastomer mixture, and wherein at least one layer D composed of a weave or loop-formed knit or loop-drawn knit has been embedded into this outer layer.

This leads to further optimization of the fire-retardant properties.

19 Claims, 2 Drawing Sheets

(56) References Cited

U.S. PATENT DOCUMENTS

| | | | |
|---|---|---|---|
| 2007/0205545 A1 | 9/2007 | Thurow et al. | |
| 2010/0183856 A1 | 7/2010 | Kind | |
| 2010/0288434 A1* | 11/2010 | Falla | A41C 3/0014 156/267 |
| 2015/0203665 A1 | 7/2015 | Grigoriew | |

FOREIGN PATENT DOCUMENTS

| | | |
|---|---|---|
| CN | 104448202 A | 3/2015 |
| CN | 104619739 A | 5/2015 |
| DE | 102007023995 A1 | 11/2008 |
| DE | 102009044533 A1 | 5/2011 |
| DE | 102011000410 A1 | 8/2012 |
| DE | 102011002230 A1 | 10/2012 |
| EP | 2181842 A2 | 5/2010 |
| EP | 2196492 A1 | 6/2010 |
| EP | 2549143 A1 | 1/2013 |
| WO | 2011057880 A1 | 5/2011 |
| WO | 2014019008 A1 | 2/2014 |

* cited by examiner

ARTICLE, PARTICULARLY AN AIR SPRING BELLOWS, A METAL-RUBBER ELEMENT, OR A VIBRATION DAMPER

BACKGROUND OF THE INVENTION

The invention relates to an article having a main body with elastic characteristics, in particular an air spring bellows, a metal-rubber element or a vibration damper.

DETAILED DESCRIPTION OF THE INVENTION

Figure 1:
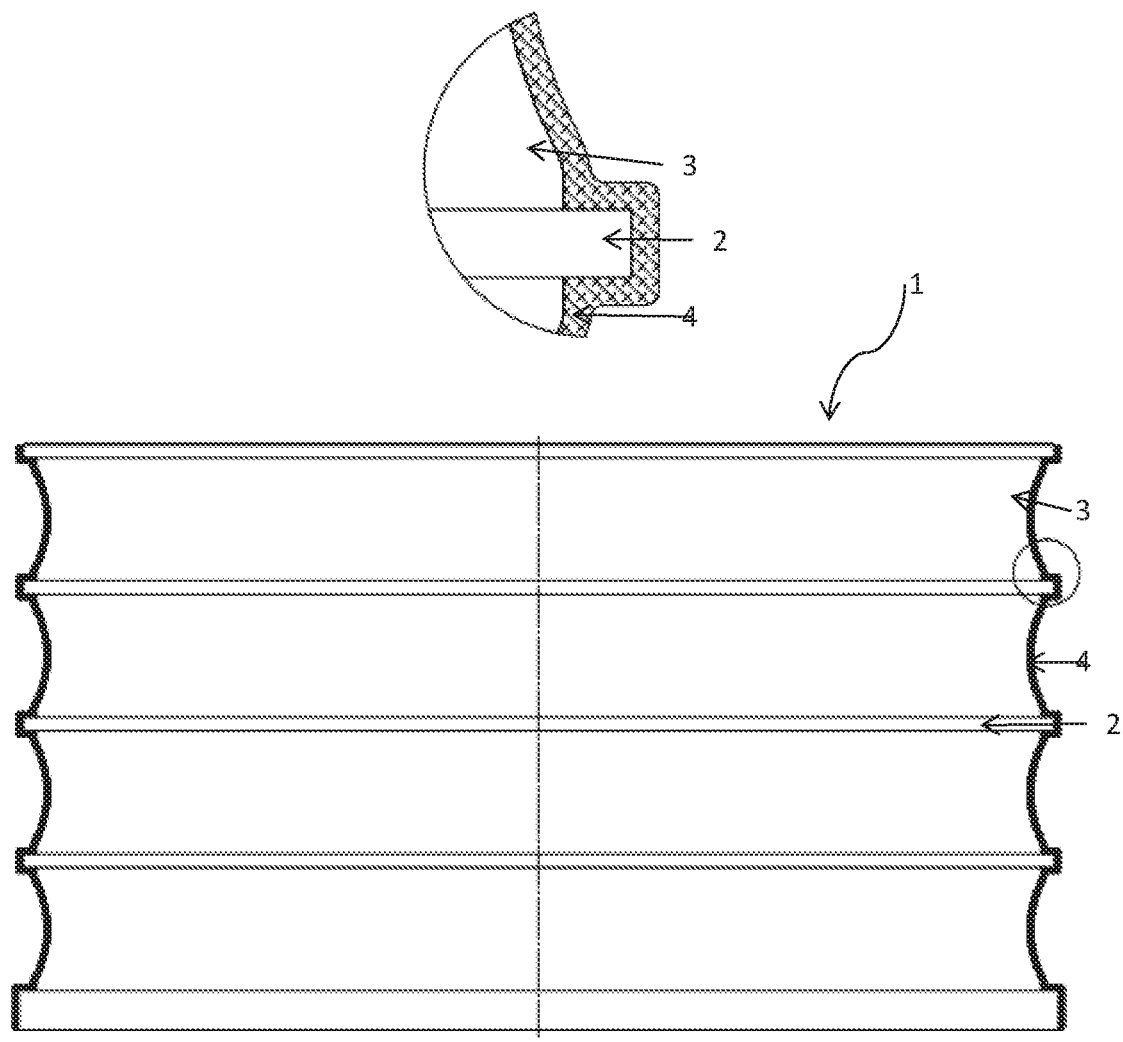
FIG. 1 shows an article that has a single-layer or multi-layer main body having elastic properties.
Figure 2:
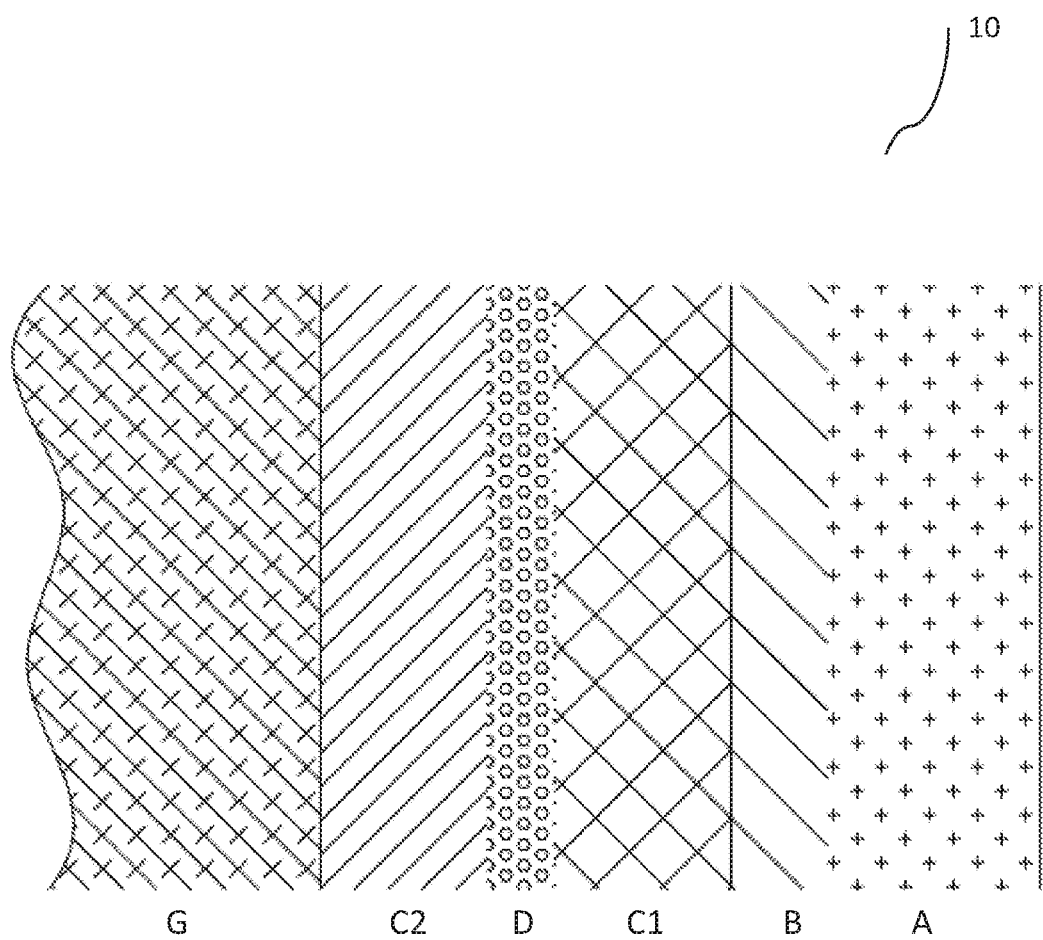
FIG. 2 shows a main body having an inner cap A, a second layer B and an inner cap C.

Articles having elastic properties that are used for the suspension of, for example, motor vehicles or track vehicles and/or vibration damping are made using elastomeric mixtures, also known as rubber mixtures. These elastomeric mixtures typically used for the fundamental properties of such articles are well known. Articles having outstanding elastic properties, for example metal-rubber elements or vibration dampers, preferentially contain vulcanized mixtures of rubber which are predominantly based on natural rubber (NR) and/or polyisoprene rubber (IR). Articles having very good resistance to weathering, mineral oil and heat, examples being air spring bellows, preferentially contain vulcanized mixtures of rubber which are predominantly based on chloroprene rubber (CR). However, articles comprising these elastomeric mixtures display distinct disadvantages in fire behavior. The evolution of thick smoke is one of the consequences of a fire. The heat release rate is particularly high in the combustion process of those of the aforementioned elastomeric mixtures which are predominantly based on NR and/or IR. The evolving smoke from the combustion process of elastomeric mixtures based predominantly on CR is toxic to humans and animals.

The recent increase in fire protection requirements as reflected above all in the tightened fire protection standard EN 45545 is driving an increased need for polymer articles optimized in fire protection. These fire protection requirements are no longer met either by the aforementioned elastomeric mixtures that are predominantly based on NR and/or IR, above all because of the required maximum heat release rate, but also the flame-resistant elastomeric mixtures that are predominantly based on CR, particularly because of the required smoke toxicity. Articles comprising these elastomeric mixtures alone thus usually no longer meet the tightened requirements.

A usual way to improve the fire behavior of rubber mixtures is to directly incorporate fire-retardant substances into the mixture. However, the general consequence of taking this measure with the articles in question is that there is a significant deterioration in their physical properties, particularly the suspension, setting and/or vibration properties. Even fire protection coatings as described in WO 2014/019008 A1 or else in EP 2196492 B1 are only of limited suitability for assuring lasting fire protection of the article. What is found here is firstly a low tensile strength which has an adverse effect on stability; secondly, these coatings become detached comparatively quickly from the article, especially under dynamic stress. Any second vulcanization process necessary in the production of the end products, especially in the production of injection-molded articles such as metal-rubber elements, particularly reduces the tear propagation resistance of the mixture of the main body owing to the customary tendency to reversion, especially of mixtures based on BR.

Moreover, inadequate compression set values are found in the fire protection coatings described in WO 2014/019008 A1, especially at relatively high temperatures (>70° C.). At the same time, the fire protection layer has to be comparatively thick in order to assure adequate fire protection. The fire protection measure described in EP 2196492 B1, by contrast, shows a retarded onset of the fire protection effect by virtue of the comparatively high onset temperature of the expandable graphites used therein.

The invention then has for its object to provide an article having an optimized fire protection behavior to meet the tightened requirements, particularly those described in EN 45545. At the same time the required physical characteristics of the article shall remain at a similar level and the complexity in the production process shall not be significantly increased.

This object is achieved in that the article has a single-layer or multilayer main body, wherein the outer layer C consists at least of a first lamina C1 and a further lamina C2 and each lamina is formed from an elastomer mixture, wherein at least one layer D composed of a weave or loop-formed knit or loop-drawn knit has been embedded into this outer layer C between the first lamina C1 and the further lamina C2.

The following constructions of the article are possible here in accordance with the invention:

Variant 1:

In a preferred embodiment, the main body has a single layer, such that the layer D composed of a weave or loop-formed knit or loop-drawn knit has been embedded into the single-layer C which has at least two laminas C1/C2 and each lamina is formed from an elastomer mixture.

This results in the following layer structure: C1, D, C2.

The individual layers will be elucidated in detail hereinafter.

Variant 2:

In a particularly preferred embodiment, the main body has multiple layers. The first layer A is what is called the "inner cap", formed from an elastomer mixture. There follows a second layer B which is formed from at least one strength member. There subsequently follows the outer layer C which has at least two laminates C1/C2 and each lamina is formed from an elastomer mixture into which at least one layer D or a weave or loop-formed knit or loop-drawn knit has been embedded.

This results in the following layer structure: A, B, C1, D, C2.

The individual layers will be elucidated in detail hereinafter.

Variant 3:

In a very particularly preferred embodiment, the main body has multiple layers. The first layer A is what is called the "inner cap", formed from an elastomer mixture. There follows a second layer B which is formed from at least one strength member. There subsequently follows the outer layer C which has at least two laminates C1/C2 and each lamina is formed from an elastomer mixture into which at least one layer D or a weave or loop-formed knit or loop-drawn knit has been embedded. In addition, the layer D composed of a weave or loop-formed knit or loop-drawn knit which has been embedded in the outer layer C may be followed by a further layer E based on at least one thermoplastic, preferably in the form of a film. The layer D composed of a weave, loop-formed knit or loop-drawn knit and the layer E based on a thermoplastic have thus both been embedded into the outer layer C.

This results in the following layer structure: A, B, C1, D, E, C2.

The individual layers will be elucidated in detail hereinafter.

Variant 4:

In a further very particularly preferred embodiment, the main body has multiple layers. The first layer A is what is called the "inner cap", formed from an elastomer mixture.

There follows a second layer B which is formed from at least one strength member. There subsequently follows the outer layer C which has at least two laminates C1/C2 and each lamina is formed from an elastomer mixture into which at least one layer D or a weave or loop-formed knit or loop-drawn knit has been embedded. In addition, atop this outer layer C there may also be a layer G composed of a weave, loop-formed knit or loop-drawn knit. This results in the following layer structure: A, B, C1, D, C2, G.

The individual layers will be elucidated in detail hereinafter.

Variant 5:

In a further very particularly preferred embodiment, the main body has multiple layers. The first layer A is what is called the "inner cap", formed from an elastomer mixture. There follows a second layer B which is formed from at least one strength member. There subsequently follows the outer layer C which has at least two laminates C1/C2 and each lamina is formed from an elastomer mixture into which at least one layer D or a weave or loop-formed knit or loop-drawn knit has been embedded. Atop the layer D composed of a weave or loop-formed knit or loop-drawn knit which has been embedded in the outer layer C there is a further layer E based on at least one thermoplastic, preferably in the form of a film. The layer D composed of a weave, loop-formed knit or loop-drawn knit and the layer E based on thermoplastic have thus both been embedded into the outer layer C composed of an elastomer mixture. In addition, atop this outer layer C there may also be a layer G composed of a weave, loop-formed knit or loop-drawn knit.

This results in the following layer structure: A, B, C1, D, E, C2, G.

The individual layers will be elucidated in detail hereinafter.

Layers A, B and C form the main body of the article, wherein layer C consists of at least two laminas C1 and C2.

Layer A

The first layer A is called the "inner cap", which is formed from an elastomer mixture and has particularly good elastic properties. The elastomer mixture is a vulcanizable, preferably thermoplastic-free, rubber mixture comprising at least one rubber component and further mixing ingredients. Useful rubber components include in particular: ethylene-propylene rubber (EPM), ethylene-propylene-diene monomer rubber (EPDM), nitrile rubber (NBR), (partially) hydrogenated nitrile rubber (HNBR), fluoro rubber (FKM), chloroprene rubber (CR), natural rubber (NR), styrene-butadiene rubber (SBR), isoprene rubber (IR), butyl rubber (IIR), bromobutyl rubber (BIIR), chlorobutyl rubber (CIIR), brominated copolymer of isobutylene and para-methylstyrene (BIMS), butadiene rubber (BR), chlorinated polyethylene (CM), chlorosulfonated polyethylene (CSM), alkylated chlorosulfonated polyethylene (ACSM), polyepichlorohydrin (ECO), terpolymers of ECO with ethylene oxide and unsaturated monomers (ETER), ethylene-vinyl acetate rubber (EVA), acrylate rubber (ACM), ethylene-acrylate rubber (AEM), silicone rubber (MQ, VMQ, PVMQ, FVMQ), fluorinated methylsilicone rubber (MFQ), perfluorinated propylene rubber (FFPM), perfluorocarbon rubber (FFKM), polyurethane (PU).

The aforementioned types of rubber may be uncut. The use of a blend is also possible. Which type of rubber is preferred depends on the nature of the article. Mixing ingredients of the customary type include at least one crosslinker or crosslinker system (crosslinking agent plus accelerator). Additional mixing ingredients usually yet include a filler and/or a processing aid and/or a plasticizer and/or an antioxidant and also optionally further additives (e.g., color pigments, reinforcing fibers).

In this regard, reference is made to the general art of rubber mixing technology.

Layer B

There follows a second layer B which is formed from at least one strength member. This is preferably a cord weave composed of one or more laminas, preferably of two laminas, having good adhesion to the layer A.

The layer B forms what is called the support skeleton. Materials used for the layer B may be any known synthetic and natural materials alone or in combination, i.e. in the form of a hybrid weave.

Useful synthetic materials especially include synthetic polymers, for example polyacrylonitrile, polypropylene, polyester, polyamide, polyurethane, polyphenylene sulfide, polyoxadiazole, aramids, such as p-aramid, m-aramid or copoly-para-aramid, polyimide, polyetherimide, polyetheretherketone, polyethylene 2,6-naphthalate, polyphenylene, polyphenylene oxide, polyphenylene sulfide, polyphenylene ether, polybenzoxazoles, polyvinyl alcohol. The natural materials may be rockwool or asbestos, or cotton, flax or hemp, or wool or silk.

Inorganic materials such as glass, ceramic, carbon, metal, for example steel, or stone, for example basalt, are likewise conceivable.

Preference is given to polyamide, especially PA 6,6, or polyester, alone or in combination. For achievement of sufficient processing tackiness during the process for production of the article, the cord weave may have been rubberized or frictionized on one or both sides. Rubberization can preferably be accomplished either using a composition which is quantitatively and/or qualitatively the same as the composition for the lamina C1 or is quantitatively and/or qualitatively the same as the composition for the layer A. This leads to further lowering of the complexity in the production process and creates adhesive bond suitable for dynamic conditions.

Layer C

The layer C forms what is called the "outer cap" of the article. The layer C has at least two laminas, the inner portion C1 and the outer portion C2 of the layer C each being formed in each case from an elastomer mixture. The elastomer mixtures for the lamina C1 and the layer A may be qualitatively and/or quantitatively identical or different than one another. It is preferable when the elastomer mixtures for the lamina C1 and the layer A are qualitatively and quantitatively identical. This is the simplest way of implementing this for production purposes without unnecessary additional complexity. The elastomer mixture of the lamina C1 is a vulcanizable, preferably thermoplastic-free, rubber mixture comprising at least one rubber component and further mixing ingredients. Useful rubber components include in particular: ethylene-propylene rubber (EPM), ethylene-propylene-diene monomer rubber (EPDM), nitrile rubber (NBR), (partially) hydrogenated nitrile rubber (HNBR), fluoro rubber (FKM), chloroprene rubber (CR), natural rubber (NR), styrene-butadiene rubber (SBR), isoprene rubber (IR), butyl rubber (IIR), bromobutyl rubber (BIIR), chlorobutyl rubber (CIIR), brominated copolymer of isobutylene and para-methylstyrene (BIMS), butadiene rubber (BR), chlorinated polyethylene (CM), chlorosulfonated polyethylene (CSM), alkylated chlorosulfonated polyethylene (ACSM), polyepichlorohydrin (ECO), terpolymers of ECO with ethylene oxide and unsaturated monomers (ETER), ethylene-vinyl acetate rubber (EVA), acrylate rubber (ACM), ethylene-acrylate rubber (AEM), silicone rubber (MQ, VMQ, PVMQ, FVMQ), fluorinated methylsilicone rubber (MFQ), perfluorinated propylene rubber (FFPM), perfluorocarbon rubber (FFKM), polyurethane (PU).

The aforementioned types of rubber may be uncut. The use of a blend is also possible. Which type of rubber is preferred depends on the nature of the article. Mixing ingredients of the customary type include at least one crosslinker or crosslinker system (crosslinking agent plus accelerator). Additional mixing ingredients usually yet include a filler and/or a processing aid and/or a plasticizer and/or an antioxidant and also optionally further additives (e.g., color pigments, adhesion promoters, flame retardants, reinforcing fibers). In this regard, reference is made to the general art of rubber mixing technology. The elastomer mixture of the lamina C2 is at least one elastomeric mixture having fire-retardant and/or self-extinguishing and/or flame-retardant properties. In principle, it is possible to use all elastomers already described above for the lamina C1. However, the elastomers used are preferably ECO, ETER, NR, CSM, CPE, CR and/or silicone rubber, alone or in combination. The thickness of the lamina C2 is preferably chosen such that it imparts adequate fire protection to the article. For further improvement of the fire protection characteristics, the elastomer mixture for the lamina C1 and/or the elastomer mixture for the lamina C2 may comprise metal particles, for example aluminum in the form of aluminum flakes. This leads to a further reduction in the layer thickness and hence to a thinner overall article. A coating based on at least one fluorinated elastomer for optimization of dynamic durability is likewise conceivable.

The lamina C2 may completely or partially cover the article. "Partially" in this context means that merely certain, defined regions and/or portions of the article are provided with the lamina C2. The elastomer mixture of the lamina C2 may also, as well as additional mixture ingredients as already described for the layer A and the lamina C1, also comprise further constituents that have a fire-retardant effect or at least reduce the flammability. These may especially be flame retardants, for example stannates, such as zinc stannate or zinc hydroxystannate, hydroxides, such as magnesium hydroxide or aluminum hydroxide, cyanurates, such as melamine cyanurate, borates, such as zinc borate, phosphorus-containing components, such as resorcinol diphosphate or aromatic polyphosphates, nitrogen-containing components, such as ammonium phosphate, carbonates, such as calcium carbonate or magnesium carbonate, expandable graphite or intumescent mixtures. Intumescent mixtures expand to give foams. They are used to provide protection from the effects of heat and fire to combustible materials such as plastics or wood, and also steel, which suffers a loss of strength at elevated temperature.

Optionally, small amounts of antimony trioxide may also be additionally used, despite the hazard to health, in combination with at least one of the recited flame retardants.

The flame retardants may each be used alone or in combination. For optimization of fire inhibition, particular preference is given to the use of glass microbeads and/or hollow glass microbeads which have preferably been prepared so as to facilitate adhesion, and/or hollow plastic beads having a flexible polymer shell and/or reflective substances, for example metal particles, especially of aluminum and/or brass. The glass microbeads and/or the hollow glass microbeads melt in the event of fire and form vitreous, insulating layers. If they are hollow beads, preferably hollow glass microbeads, in a preferred variant, there may be fire-retardant substances encapsulated in the hollow beads themselves, which are released after the outer shell has melted and then have an additional fire-retardant effect in concentrated form.

The hollow plastic beads in particular may be in already expanded form and/or in expandable form.

In a preferred embodiment, expandable hollow plastic beads are used. A gas is encapsulated in the expandable hollow plastic beads. When heat is supplied, there is an increase in the gas pressure within the shell, which simultaneously softens. The associated increase in volume leads to an increase in the layer thickness, which leads to a further insulating effect even before the actual fire.

In addition, the glass microbeads and/or hollow glass microbeads and/or hollow plastic beads may have been coated with at least one metal, for example aluminum. This additionally increases the efficacy of the thermal insulation.

Layer D

The layer D consists of a weave or loop-formed knit or loop-drawn knit which has been embedded in the outer layer C. The layer D is thus preferably between the laminas C1 and C2. Preference is given here to a weave or a loop-formed knit in which the two sides may each have been modified, according to the working example and application, with at least one adhesion promoter. The adhesion promoter may be resorcinol-formaldehyde latex, a solution based on dinitrosobenzene, silane or an adhesion promoter based on at least one rubber.

Both sides may have been modified with the same adhesion promoter or with different adhesion promoters.

In a particularly preferred embodiment, the weave is a bi-stretch weave which has a high elastic component in the horizontal and vertical directions, i.e. in warp direction and in weft direction. The bi-stretch weave has an extensibility of greater than 50% in each case in warp direction and in weft direction, preferably of greater than 250%.

In order to achieve extensibility in the different directions, there is preferably a sufficient amount, preferably 5% to 50% by weight, of elastane present in warp direction and in weft direction. Alternatively, elongation in both directions can be obtained by appropriate textile manufacturing technologies, for example applying as little tensile stress as possible in the winding of the freshly woven textile sheet.

The use of a bi-stretch weave with the advantageous property of yielding or extensibility in all directions stops elastomer mixture from being effectively forced away during the embossing phase, i.e. forming phase, in the vulcanization process.

Materials used for the weave, preferably the bi-stretch weave, or loop-formed knit or loop-drawn knit may be any of the natural and synthetic materials known to a person skilled in the art.

Useful synthetic materials especially include synthetic polymers, for example polyacrylonitrile, polypropylene, polyester, polyamide, polyurethane, polyphenylene sulfide, polyoxadiazole, aramids, such as p-aramid, m-aramid or copoly-para-aramid, polyimide, polyetherimide, polyetheretherketone, polyethylene 2,6-naphthalate, polyphenylene, polyphenylene oxide, polyphenylene sulfide, polyphenylene ether, polybenzoxazoles, polyvinyl alcohol. The natural materials may be rockwool or asbestos, or cotton, flax or hemp, or wool or silk.

Inorganic materials such as glass, ceramic, carbon, metal or stone, for example basalt, are likewise conceivable.

It is advantageous when a hybrid material composed of cotton, polyamide or polyester and elastane, with a cotton-dominating side and a polyamide- or polyester-dominating side, is used for the weave, especially the bi-stretch weave, and/or the loop-formed knit.

In the case of a combination of this kind, it is possible to use the weave, loop-formed knit or loop-drawn knit, prior to the production of the article, to produce a shell according to the article diameter required, wherein the seams of this shell can be welded. The cotton component, in the event of fire, delays "pop-out", i.e. the breakthrough of the lower, more highly combustible layers to the heat-exposed surface, the layer B that may have melted because of the heat, since the cotton component itself cannot melt. This leads to a distinct improvement in fire protection characteristics.

Particularly good fire protection characteristics are found, for example, in the case of use of a bi-stretch material based on aramid and elastane.

Layer E

The further layer E is based on at least one thermoplastic and is preferably on the side of the layer D facing layer C2. Thermoplastics used may, for example, be polyolefin, especially polyethylene (PE), such as LD-PE, LLD-PE, UHMW-PE, or polypropylene (PP), polystyrene (PS), polyamide (PA), for example PA 6 or PA 6,6, polyesters, for example PET, PEN or PBT. The layer E, in a particularly preferred embodiment, takes the form of a film. The use of PE film has been found to be of particularly good suitability, since it forms a particularly good adhesive bond especially in the case of peroxidic crosslinking elastomer mixtures and hence it is possible in some cases to dispense with further adhesion promoters. According to the nature of the article and the nature of the further layers, the layer C has a particularly good adhesion-enhancing effect. It can be applied to the article blank with the aid of a radiant heater and pressure.

Layer G

The layer G composed of a weave, loop-formed knit or loop-drawn knit may additionally be atop the outer layer C. This is preferably a weave composed of warp and weft, more preferably a bi-stretch weave, as already described for the layer D. The layer G can distinctly reduce the extent to which the elastomer mixture of the lamina C2 flows away under compressive stress, and in some cases even prevent it completely. In addition, the layer G supports the other layers of the article, such that any losses of adhesion that may occur can be tolerated. Advantageously, the layer G additionally reduces the coefficient of friction of the surface of the article, so as to result in lower article abrasion. The layer G may contain metal particles, for example aluminum in the form of aluminum flakes. The heat reflection from the metal particles leads to further optimization of the fire protection characteristics. Likewise conceivable is a coating based on at least one fluorinated elastomer, for example FKM or PTFE, for optimization of the abrasion characteristics.

The layers indicated according to the abovementioned variants 1 to 5 are combined before or during the manufacture of the blank, i.e. before the actual vulcanization process. In the first phase of the vulcanization, called the flow phase or forming phase, it is thus possible for the different layers to coalesce efficiently with one another, which has a positive effect on the quality of adhesion of the layers to one another. No additional and costly second vulcanization process is required.

The article is preferably an air spring bellows, a metal-rubber element, a vibration damper, a damping element of a bearing, of a bushing or of a multilayered spring or conical spring. The article may alternatively be a tubular body. Tubular bodies are, for example, feed hoses of any kind, air spring bellows (cross-ply bellows, axial bellows) and compensators in various embodiments (e.g., torsion compensator, lateral compensator). The article may likewise be a drive belt.

The invention claimed is:

1. An article comprising a main body having elastic properties, the main body comprising an outer layer C, wherein the outer layer C comprises a first lamina C1 and second lamina C2, wherein the first lamina C1 and the second lamina C2 each is formed from an elastomer mixture, wherein at least one layer D composed of a weave is embedded between the first lamina C1 and the second lamina C2, and wherein the at least one layer D is comprised of a bi-stretch fabric; and the main body further comprising a strength layer B formed on the first lamina C1 and formed from at least one strength member and having a cord weave composed of two or more laminas and an inner cap layer A formed on the strength layer B.

2. The article as claimed in claim 1, further comprising a further layer E disposed adjacent the at least one layer D, and wherein the further layer E is disposed the first lamina C1 and the second lamina C2.

3. The article as claimed in claim 2, wherein the further layer E is disposed between the layer D and the second lamina C2.

4. The article as claimed in claim 3, wherein the further layer E is a film of polyethylene.

5. The article as claimed in claim 1, wherein the elastomer mixture for the first lamina C1 and/or the elastomer mixture for the second lamina C2 comprise(s) metal particles, preferably the metal particles are aluminum in the form of aluminum flakes.

6. The article as claimed in claim 1, wherein the elastomer mixture for the first lamina C1 comprises glass microbeads and/or hollow glass microbeads.

7. The article as claimed in claim 1, wherein the elastomer mixture for the first lamina C1 comprises fire-retardant substances encapsulated hollow beads.

8. An article comprising a main body having elastic properties, the main body comprising an outer layer C, wherein the outer layer C comprises a first lamina C1 and second lamina C2, wherein the first lamina C1 and the second lamina C2 each is formed from an elastomer mixture, wherein at least one layer D composed of a loop-formed knit is embedded between the first lamina C1 and the second lamina C2, and wherein the at least one layer D is comprised of a bi-stretch fabric; and the main body further comprising a further layer E on a side of the second lamina C2 facing the at least one layer D and the further layer E is based on a thermoplastic.

9. The article as claimed in claim 8, wherein the further layer E is a film of polyethylene.

10. The article as claimed in claim 8, wherein the elastomer mixture for the first lamina C1 and/or the elastomer mixture for the second lamina C2 comprise(s) metal particles, preferably the metal particles are aluminum in the form of aluminum flakes.

11. The article as claimed in claim 8, wherein the elastomer mixture for the first lamina C1 comprises glass microbeads and/or hollow glass microbeads.

12. The article as claimed in claim 8, wherein the elastomer mixture for the first lamina C1 comprises fire-retardant substances encapsulated hollow beads.

13. An article comprising a main body having elastic properties, the main body comprising an outer layer C, wherein the outer layer C comprises a first lamina C1 and second lamina C2, wherein the first lamina C1 and the second lamina C2 each is formed from an elastomer mixture, wherein at least one layer D composed of a loop-drawn knit is embedded between the first lamina C1 and the second lamina C2, and wherein the at least one layer D is comprised of a bi-stretch fabric; and the main body further comprising a layer E on a side of the second lamina C2 facing the at least one layer D and the layer E is based on a thermoplastic.

14. The article as claimed in claim 13, wherein the further layer E is a film of polyethylene.

15. The article as claimed in claim 13, wherein the elastomer mixture for the first lamina C1 and/or the elastomer mixture for the second lamina C2 comprise(s) metal particles, preferably the metal particles are aluminum in the form of aluminum flakes.

16. The article as claimed in claim 13, wherein the elastomer mixture for the first lamina C1 comprises glass microbeads and/or hollow glass microbeads.

17. The article as claimed in claim 4, wherein the further layer E is on a side of the at least one layer D facing the second lamina C2 and is based on a thermoplastic selected from a group comprising polyolefin, especially polyethylene (PE) and polypropylene.

18. The article as claimed in claim 17, further comprising a weave layer G composed of a bi-stretch weave on an outer surface of the second lamina C2 and the weave layer G is configured to reduce flowing of elastomer mixture from the second lamina C2 when the second lamina C2 is under compressive stress.

19. The article as claimed in claim 1, where the article is an air spring bellow.

\* \* \* \* \*